United States Patent Office 3,005,750
Patented Oct. 24, 1961

3,005,750
SYSTEMIC FUNGICIDES
Victor Flück, Leverkusen, Engelbert Kühle, Koln-Stammheim, and Richard Wegler, Leverkusen, Germany, assignors to Farbenfabriken Bayer Aktiengesellschaft, Leverkusen, Germany, a corporation of Germany
No Drawing. Filed Mar. 13, 1959, Ser. No. 799,119
Claims priority, application Germany Mar. 14, 1958
11 Claims. (Cl. 167—33)

The present invention relates to a new class of fungicides with systemic action and to processes for treating plants with active compositions containing these compounds. Generally, the active compounds of this application may be represented by the following formula:

Z=N—R wherein Z stands for a radical of a reducing sugar, R stands for an alkyl, aryl or heterocyclic radical or for the radical —NHR', wherein R' may have the significance as R or may be —COR", —CSR" or —$SO_2R''$, wherein R" again may be an alkyl, aryl or heterocyclic radical.

The fungicides known as yet mainly have a prophylactic action against fungi or their spores, if plants are treated before an infection with said fungi. Therefore, plants treated with these fungicides only become protected against fungicidal attack on parts of the plants which are really covered with fungicidal substances. Leaves or parts of plants which were not sprayed or covered are still capable of fungicidal attack. Especially buds and fresh-grown parts of plants cannot be protected with prophylactic fungicides.

For this reason, the success in combating fungi is dependent on the time of spraying plants to be protected. Also atmospheric conditions, especially rain, influence the activity of fungicides known as yet. Also light, especially heavy sunshine, sometimes is of influence on the activity of commercially known fungicides.

Inner therapeutic or curative fungicides were not known until now, and this field is not investigated, especially not regarding synthetic fungicides. There are known already some antibiotics which have to be regarded as curative fungicides, but the action of these compounds is still under discussion.

There is a heavy demand for obtaining such inner-therapeutical acting or so-called curative fungicides, i.e. for compounds which act either through the roots or through the leaves of the plant to be protected. Compounds of that type are well known in the insecticidal field where compounds are known which, if applied to the plants by their roots, act on insects through the leaves. Compounds of this type, of course, should not damage the plants or influence their metabolism in a damaging manner.

Thus, it is an object of the present invention to find compounds which act systemically on fungi. Another object is the treatment of plants to be protected with these substances. Still further objects will become apparent as the following description proceeds.

Now, in accordance with the present invention, it has been found that such valuable compounds are existing which may be represented by the general formula:

Z=N—R wherein the symbols have the significance as given above.

As an example for such derivatives of amino sugars, the glucose molecule may be shown in the three possible tautomer forms:

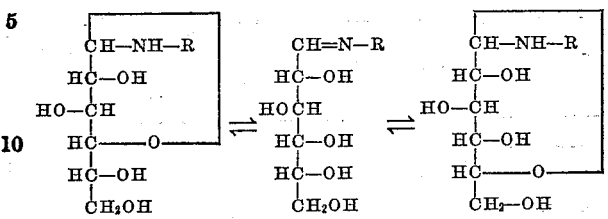

It has to be understood, however, that instead of the before-shown glucose also another sugar radical, such as the radical of galactose, fructose, gulose, arabinose, glucosamine, lactose, maltose may represent the radical Z in the above-shown formula. Furthermore, the mixture of condensation products of formaldehyde by means of lead oxide may stand for the above said radical Z. At last, also aldehyde sugars of the $C_5$ or $C_4$ series as well as glycerol aldehyde may stand for the said radical Z. Oligosaccharides with a free aldehyde group, i.e. such sugars which reduce Fehling's solution, are well within the scope of the radical Z.

The radical R in the above formula may be the radical of a primary amine, such as the methyl, ethyl and propyl radical, higher alkyl radicals, such as the dodecyl group, stearyl group, palmithyl radical, or an aromatic radical, such as the phenyl, chlorophenyl, dichlorophenyl, nitrophenyl, tolyl, cresyl radical, or the like. R may also be an aralkyl radical, such as benzyl, p-chlorobenzyl, nitrobenzyl, phenethyl, and the like. Heterocyclic radicals, such as α-pyridyl, γ-pyridyl, lutidyl, and the like are also within the scope of the meaning of R.

If R stands for the group —NHR', i.e. if the active ingredients are sugar hydrazones, R' may have the same meaning as said above in the class of R. A class of especially active compounds is obtained, if R' stands for the group —COR", —CSR" or —$SO_2R''$, i.e. if the active ingredients are sugar hydrazones derived from acyl hydrazines. The radical R" broadly may stand for any organic radical, but especially may have the same significance as given before for R.

The active compounds of this invention are partially known from the literature. If they are not known, they may be prepared by well known processes for the production of the known compounds.

The following examples may illustrate the invention without, however, limiting it in any way:

EXAMPLES

In the following examples the comparative numbers for the innertherapeutical respectively systemical action of some of the inventive compounds are given. The systemic activity has been determined on Coleus, tomatoes and white cabbage. Application occurred through the roots. Infestation of the plants with Omphalia flavida on Coleus, with Alternaria solani on tomatoes and with Alternaria oleracea on white cabbage has been carried out after 24 to 48 hours. The following compounds have been tested:

COMPOUND A

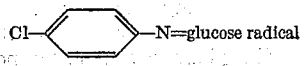

COMPOUND B

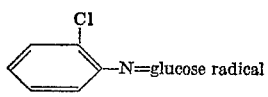

COMPOUND C

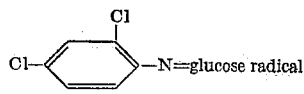

| Compound | fungus | test plant | concentration, percent | evaluation number | |
|---|---|---|---|---|---|
| | | | | treated | untreated |
| A | Omphalia flavida | Coleus | 0.025 | 14 | 100 |
| | Alternaria solani | tomatoes | 0.01 | 38 | 100 |
| B | Omphalia flavida | Coleus | 0.05 | 16 | 100 |
| | Alternaria solani | tomatoes | 0.05 | 43 | 100 |
| C | Omphalia flavida | Coleus | 0.05 | 8 | 100 |
| | Alternaria solani | tomatoes | 0.01 | 11 | 100 |

The aplication occurred three times within 24 to 48 hours.

COMPOUND D

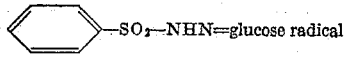

| Compound | fungus | test plant | concentration, percent | evaluation number | |
|---|---|---|---|---|---|
| | | | | treated | untreated |
| D | Omphalia flavida | Coleus | 0.01 | 21 | 100 |
| | Alternaria solani | tomatoes | 0.01 | 63 | 100 |

COMPOUND E

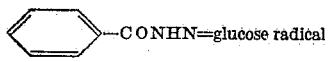

COMPOUND F

| Compound | fungus | test plant | concentration, percent | evaluation number | |
|---|---|---|---|---|---|
| | | | | treated | untreated |
| E | Omphalia flavida | Coleus | 0.01 | 22 | 100 |
| F | Omphalia flavida | Coleus | 0.01 | 8.5 | 100 |
| E | Alternaria solani | tomatoes | 0.005 | 14 | 100 |
| F | Fusarium oxysporum | tomatoes | 0.05 | 22 | 100 |
| | | | 0.01 | 43 | 100 |

A more detailed description of how the tests have been carried out is given in the following:

I. *Test with Coleus.*—Cuttings of Coleus are placed in sand for growing of roots.

Normally after 24 days they have enough roots for test purposes. The young plants should carry 7 to 8 leaves. Temperature during the tests should be between 20 to 24° C. The plants are in paper pots filled with quartz sand being in normal humidity. If tests are carried out during the winter time, the plants have to be exposed to additional light between 6 to 10 o'clock a.m. and 3 to 10 o'clock p.m. Each plant in its pot (of about 3 to 3½ inches diameter) is treated with 50 millilitres of a solution of the above said active ingredient in the concentration shown above. The treatment has been carried out three times within 24 hours in an interval of 8 hours each time. The plants are kept all time under the above described conditions. Infestation is carried out 5 days after the first application.

The fungus, Omphalia flavida (=mycena citricolor), is cultivated under laboratory conditions according to well known methods (agar nutrient+2% glucose at 18 to 220° C. for five weeks). During this time, there are produced the gemmae which are taken for infestation of the plants. For this purpose, the aforementioned gemmae are taken from the cultures and placed on a small filter paper ring (with 8 gemmae each ring). The filter paper rings are placed on the surface of the leaves so that the gemmae are between the filter paper and the leaf. The paper ring has to be kept wet. Two rings are placed on each leaf and only four leaves of the plants are infested. The plants then are placed in humid chambers at 18 to 20° C. Also during this time the paper rings have to be kept wet, if necessary, by addition of water. After 4 to 5 days the test is evaluated. Lesions of 1–2 mm. are numbered 1, lesions of 2–3 mm. have number 2, 3–4 mm. lesions are evaluated 3, and more than 5 mm. are placed 4.

The disease index and the evaluation number (EN) may be obtained according to the following equation:

(1)
$$\text{disease index} = \frac{\text{sum of (number of individuals per damage number} \times \text{damage number} \times 100)}{\text{medium value of the controls } \overline{M}^+}$$

$$\text{medium value of the controls } \overline{M}^+ = \frac{\text{sum of the lesions per plant}}{\text{number of tested plants}}$$

(2)
$$EN = \frac{\overline{M} \text{ medium value of the controls of the indices of the number of repeatings}}{\text{disease index of the control}}$$

II. *Test with tomato plants with* Altenaria solani.—Tomatoes (bonny best) are sown in normal culture soil and after 10 days replaced in another soil. After 3 to 4 weeks, in the third to fourth leaf stadium, the young plants are planted in quartz sand in pots of about 3 inches height. During the fifth to sixth leaf stadium, the first treatment with the active ingredient has been carried out. There are used for each plant 100 millilitres of the solution (concentration as shown above). In each test this application is carried out three times after 48 hours each. The plants are placed in a greenhouse at 20 to 24° C. with additional light, if tests are carried out during winter time.

The fungus, Alternaria solani, is cultivated in petri dishes in a normal nutrient (agar+2% glucose) during 10 days at 21° C. in the darkness. The occulation material is taken from 10-days-old cultures on a pound-nutrient.

A suspension of spores in aqua dest. is prepared in such a concentration that under the microscope at an enlargement number 100, 20 to 40 spores are to be seen. This suspension of spores is sprayed (air pressure 0.1 atü.) on the plants treated with the active ingredients as shown above. The plants thus infested are placed for 48 hours in humid chambers at 100% relative humidity between 20 to 24° C., and thereafter for 24 hours under normal greenhouse conditions. The evaluation is carried out using damage numbers from 1 to 4. Evaluated are only the third, fourth and fifth leaflet. The evaluation number is obtained according to the following formula:

$$\text{disease index} = \frac{\overline{M} \text{ of the sum of (number of individuals per damage number} \times \text{damage number} \times 100)}{\text{number of individuals}}$$

$$EN = \frac{\overline{M} \text{ of the disease indices of the repeatings} \times 100}{\text{disease index of the control}}$$

III. *Test on tomatoes with* Fusarium oxysporum.—Test and evaluation are carried out according to the method of Dimond et al., 1952, Bull. 557, Connecticut Agric. Exp. Stat., New Haven.

The application of the active compounds has slightly modified insofar as per plant each time 100 millilitres of the solution have been applied five times after 72 hours each. The evaluation occurred after 20 to 25 days. The infested plants are placed in a green-house at 25° C. and 60 to 70% relative humidity. If the tests are carried out during winter time, additional light has to be used. The infestation material consists of a non-diluted suspension of spores of 5-days-old fusarium cultures.

IV. *Test on white cabbage with* Alternaria oleracea.—White cabbage plants, 6 to 7 weeks old, and cultivated in a normal soil, are treated each time with 100 millilitres of a solution of the active ingredient per plant three times after 48 hours each time. The plants are left in the same soil. The fungus *Alternaria oleracea* used for the infestation has been cultivated in the darkness at normal conditions (at 20 to 24° C. on agar+2% glucose). Used are 3 to 4-days-old cultures in a suspension in a 0.1% agar-agar-solution. The concentration of this suspension has to be such one, that under the microscope at an enlargement number of 200 about 60 spores may be counted.

The spores are rubbed manually on the leaves of the white cabbage and the plants thus infested are left for 48 hours at 100% relative humidity and 24° C. in the humid chamber. Still 48 hours they are left under normal conditions in the green-house and evaluated with damage numbers 1 to 4. The final numbers have been obtained according to the foregoing description.

The preparation of the solution of the active ingredient of the above said concentration has been carried out as follows:

The active ingredients have been dissolved in 1 millilitre acetone, and this premixture has been diluted further with water to 100 millilitres.

We claim:
1. Method of combating fungi which comprises applying to plants a sugar derivative of the formula

$$Z=N-X$$

wherein Z stands for a radical of a Fehling's solution reducing sugar, and X stands for a member selected from the group consisting of alkyl, phenyl, chlorophenyl, dichlorophenyl, nitrophenyl, tolyl and cresyl radicals, and the group —NHR', R' being a member selected from the group consisting of alkyl, phenyl, chlorophenyl, dichlorophenyl, nitrophenyl, tolyl, cresyl, —COR", —CSR" and —SO₂R" radicals, R" being a member selected from the group consisting of phenyl, chlorophenyl, dichlorophenyl, nitrophenyl, tolyl and cresyl radicals.

2. Method of combating fungi which comprises applying to plants a sugar derivative of the formula $$Z=N-R$$

wherein Z stands for a radical of a Fehling's solution reducing sugar, and R stands for a member selected from the group consisting of alkyl, phenyl, chlorophenyl, dichlorophenyl, nitrophenyl, tolyl and cresyl radicals.

3. Method of combating fungi which comprises applying to plants a sugar derivative of the formula $$Z=N-NHR'$$

wherein Z stands for a radical of a Fehling's solution reducing sugar, and R' stands for a member selected from the group consisting of alkyl, phenyl, chlorophenyl, dichlorophenyl, nitrophenyl, tolyl and cresyl radicals.

4. Method of combating fungi which comprises applying to plants a sugar derivative of the formula $$Z=N-NH-\underset{\underset{O}{\|}}{C}-R''$$

wherein Z stands for a radical of a Fehling's solution reducing sugar, and R" stands for a member selected from the group consisting of phenyl, chlorophenyl, dichlorophenyl, nitrophenyl, tolyl and cresyl radicals.

5. Method of combating fungi which comprises applying to plants a sugar derivative of the formula $$Z=N-NH-\underset{\underset{S}{\|}}{C}-R''$$

wherein Z stands for a radical of a Fehling's solution reducing sugar, and R" stands for a member selected from the group consisting of phenyl, chlorophenyl, dichlorophenyl, nitrophenyl, tolyl and cresyl radicals.

6. Method of combating fungi which comprises applying to plants a sugar derivative of the formula $$Z=N-NH-SO_2-R''$$

wherein Z stands for a radical of a Fehling's solution reducing sugar, and R" stands for a member selected from the group consisting of alkyl, phenyl, chlorophenyl, dichlorophenyl, nitrophenyl, tolyl and cresyl radicals.

7. A method of combatting fungi which comprises applying to plants a compound of the formula

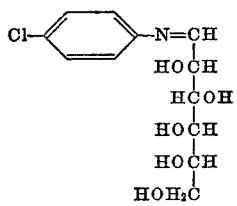

8. A method of combatting fungi which comprises applying to plants a compound of the formula

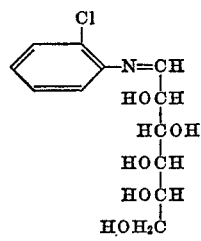

9. A method of combatting fungi which comprises applying to plants a compound of the formula

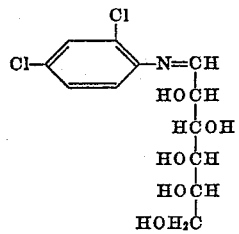

10. A method of combatting fungi which comprises applying to plants a compound of the formula

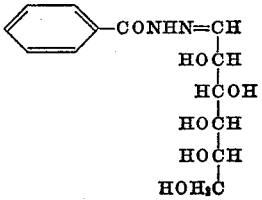

11. A method of combatting fungi which comprises applying to plants a compound of the formula
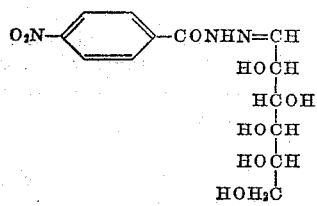
References Cited in the file of this patent
UNITED STATES PATENTS
2,355,911 Graenacher et al. _____ Aug. 15, 1944
FOREIGN PATENTS
80,040 Netherlands _____ Dec. 15, 1955